US010619501B2

(12) United States Patent
Davies et al.

(10) Patent No.: US 10,619,501 B2
(45) Date of Patent: Apr. 14, 2020

(54) SEALING ELEMENT

(71) Applicant: ROLLS-ROYCE plc, London (GB)

(72) Inventors: Christopher Davies, Derby (GB); Ingo H. J. Jahn, Queensland (AU)

(73) Assignee: ROLLS-ROYCE plc, London (GB)

( * ) Notice: Subject to any disclaimer, the term of this patent is extended or adjusted under 35 U.S.C. 154(b) by 693 days.

(21) Appl. No.: 15/174,512

(22) Filed: Jun. 6, 2016

(65) Prior Publication Data

US 2016/0369641 A1 Dec. 22, 2016

(30) Foreign Application Priority Data

Jun. 18, 2015 (GB) .................................. 1510719.6

(51) Int. Cl.
*F01D 11/00* (2006.01)
*F16J 15/34* (2006.01)

(52) U.S. Cl.
CPC ......... *F01D 11/003* (2013.01); *F16J 15/3432* (2013.01); *F16J 15/3472* (2013.01); *F05D 2240/55* (2013.01)

(58) Field of Classification Search
CPC ........ F01D 11/00; F01D 11/003; F01D 11/02; F01D 11/025; F04D 29/102; F04D 29/083; F04D 29/12; F04D 29/122; F16J 15/3432; F16J 15/3472; F16C 2360/23
See application file for complete search history.

(56) References Cited

U.S. PATENT DOCUMENTS

| 5,743,707 A * | 4/1998 | Battig ................... F16J 15/164 277/384 |
| 6,007,069 A * | 12/1999 | Sadowski ............... F16J 15/363 277/374 |
| 2007/0160467 A1 | 7/2007 | Lienau et al. |

FOREIGN PATENT DOCUMENTS

| EP | 2 740 975 A1 | 6/2014 |
| GB | 2 033 978 A | 5/1980 |

OTHER PUBLICATIONS

Dec. 14, 2015 Search Report issued in British Patent Application No. 151719.6.

* cited by examiner

*Primary Examiner* — Richard A Edgar
(74) *Attorney, Agent, or Firm* — Oliff PLC

(57) ABSTRACT

The present invention provides a sealing element for an air-riding seal system. The seal has a mounting portion for mounting on a rotor and a sealing portion having a sealing face for facing a second sealing element. A bridging portion is provided extending radially between the mounting and sealing portions. The bridging portion allows axial displacement between the mounting portion and sealing portion and/or angular variation of the sealing face relative to the mounting portion and may be a pliable/flexible membrane structure allowing said axial displacement/angular variation by flexing.

13 Claims, 3 Drawing Sheets

SEALING ELEMENT

FIELD OF THE INVENTION

The present invention relates to a sealing element and a sealing assembly incorporating the sealing element for use in an air-riding seal arrangement in a gas turbine engine.

BACKGROUND OF THE INVENTION

Fluid seals between a rotating component and a static component are used in gas turbine engines to restrict the flow of a fluid from a region of high pressure to a region of lower pressure. As shown in FIG. 1, an air-riding seal system 1 typically comprises a first sealing ring 2 mounted on a rotor 3 which faces a second, static sealing ring 4 which is mounted in a housing 5 and biased towards the first sealing ring 2 by an axial spring 9.

When the rotor 3 is stationary, the sealing face 6 of the first sealing ring 2 is pressed against the sealing face 7 of the second sealing ring 4 thus preventing leakage from the high pressure region to the low pressure region.

As shown in FIG. 2, the sealing face 6 of the first sealing ring 2 has a series of spiral grooves 18. As the first sealing ring 2 rotates with the rotor 3, the spiral grooves 18 create a lift force which results in an air film between the sealing face 6 of the first sealing ring 2 and the sealing face 7 of the second sealing ring 4. This air film maintains the seal between the high pressure and low pressure regions whilst substantially eliminating wear on the sealing surfaces 6, 7 of the sealing rings 2, 4.

Due to manufacturing tolerances, build tolerances, bearing clearances and engine-running deflections, there is a tendency for the mounting face 8 of the first sealing ring 2 (and therefore the sealing face 6) to be angled away from an orientation perpendicular to the axis of rotation 10 of the rotor 3 as shown in FIG. 3. This results in the first sealing ring 2 acting like a swash-plate with the distance between the sealing surface 6 on the first sealing ring 2 and the sealing surface 7 on the second sealing ring 4 having positional and time variations which can result in failure of the air film seal and/or contact between the two sealing rings 2, 4. To avoid these variations and seal failure/sealing ring contact, it is necessary for the second sealing ring 4 to track the first sealing ring 2. This can lead to wear or even failure of the secondary seal.

Additional sealing (e.g. an elastomeric seal) is provided between the second sealing ring 4 and housing 5 to ensure sealing functionality of the system is maintained.

Furthermore, any deformities in the material of the rotor 3 (e.g. arising from circumferential weave), may be transmitted through the mounting face 8 of the first sealing ring 2 through to the sealing surface 6 of the first sealing ring 2 causing variations in the spacing between the sealing surfaces 6, 7 which reduces the efficiency of the air-film seal.

Accordingly, there is a need for an air-riding seal arrangement that allows a reliable seal between a rotating component and a static component that reduces wear on seal components and reduces the effects of any deformations in the rotor material on sealing efficiency.

SUMMARY OF THE INVENTION

In a first aspect, the present invention provides an air-riding seal arrangement comprising: a sealing element having: a mounting portion for mounting on a rotor; a sealing portion having a sealing face for facing a second sealing element; and a bridging portion which is axially recessed from the sealing face of the sealing portion and extends radially between the mounting portion and sealing portion, wherein the bridging portion allows axial displacement between the mounting portion and sealing portion and/or angular variation of the sealing face relative to the mounting portion; a rotor on which the sealing element is mounted; and, a second sealing element having a sealing surface facing the sealing element.

By providing a bridging portion that allows axial displacement between the mounting and sealing portions and/or angular variation of the sealing face relative to the mounting portion, the two portions are effectively decoupled. This means that transmittal of any swash movements arising from non-perpendicular mounting of the mounting portion on the rotor to the sealing portion are significantly reduced thus reducing swash movements at the air film interface between the two sealing elements. This increases reliability of the seal and reduces wear on the seal components. Furthermore, any deformations in the mounting face of the rotor (e.g. arising from circumferential weave) are isolated from the sealing portion thus ensuring that the sealing efficiency is maximised.

Optional features of the invention will now be set out. These are applicable singly or in any combination with any aspect of the invention.

In some embodiments, the mounting portion is radially inwards of the sealing portion.

In some embodiments, the bridging portion is flexible/pliable to allow axial displacement between the mounting portion and bridging portion and/or angular variation of the sealing face relative to the mounting portion.

In some embodiments, the bridging portion is an annular, radially-extending portion.

In some embodiments, the bridging portion is thinner (i.e. has a reduced axial dimension) than the mounting portion and/or the sealing portion. The bridging portion is effectively a thin membrane structure that allows axial displacement between the mounting and sealing portions and/or angular variation of the sealing face relative to the mounting portion by flexing of the bridging portion. The term "axial" is intended to refer to the axis of rotation of the rotor.

In some embodiments, the mounting portion, bridging portion and sealing portion are integrally formed. They may be individually or integrally formed e.g. of any one of steel, titanium, nickel alloy, ceramic or a composite material.

In some embodiments, the bridging portion is at least partly axially recessed from the sealing face of the sealing portion.

In some embodiments, the bridging portion is at least partly axially recessed from a mounting surface on the mounting portion, the mounting surface for mounting against the rotor.

In some embodiments, the bridging portion extends between the axial centre of the mounting portion and the axial centre of the sealing portion.

In some embodiments, the sealing element comprises a first shoulder portion between the mounting portion and the bridging portion, the first shoulder portion comprising at least one concave surface. In some embodiments, the first shoulder portion comprises two concave surfaces, on opposing axial sides of the sealing element.

In some embodiments, the sealing element comprises a second shoulder portion between the sealing portion and the bridging portion, the second shoulder portion comprising at least one concave surface. In some embodiments, the second shoulder portion comprises two concave surfaces, on opposing axial sides of sealing element.

In some embodiments, the bridging portion increases or decreases in axial width between the mounting portion and sealing portion e.g. between the first and second shoulder portions. In other embodiments, the bridging portion may have a substantially constant axial width between the mounting portion and sealing portion or between the first and second shoulder portions.

In some embodiments, the mounting portion is an annular portion comprising a central bore for receiving the rotor.

In some embodiments, the sealing portion is an annular portion. The sealing surface may comprise groove e.g. radially extending spiral grooves In some embodiments, the rotor comprises an annular flange or a stepped portion having a rotor mounting surface and the mounting portion of the sealing element is affixed to the rotor mounting surface, In some embodiments, the mounting portion comprises a mounting surface and the mounting surface is affixed in abutment with the rotor mounting surface.

Where the rotor mounting surface and/or the mounting surface on the mounting portion is/are not strictly perpendicular to the axis of rotation of the rotor, the bridging portion will not be perpendicular to the axis of rotation when the rotor is stationary. However, upon rotation of the rotor and sealing element, the centrifugal forces and lift forces generated by the air film between the sealing surfaces act to cause flexing of the bridging portion to move it towards an orientation that is substantially perpendicular to the axis of rotation of the rotor thus reducing any swath movements of the sealing portion.

Furthermore, any deformities in the rotor mounting surface (e.g. arising from circumferential weave), are decoupled from the sealing portion by the bridging portion such that the sealing efficiency is maintained.

In some embodiments, the second sealing element is a carbon ring.

In some embodiments, the air-riding seal arrangement further comprises a static housing for supporting the second sealing element. In some embodiments the air-riding seal arrangement further comprises an axial biasing element e.g. an axial spring for biasing the second sealing element towards the sealing element.

In a fourth aspect, the present invention provides a gas turbine engine having a seal element according to the first aspect, a seal assembly according to the second aspect or an air-riding seal arrangement according to the third aspect.

The seal assembly or air-riding seal arrangement may be provided to seal bearing chambers within the main engine. It/they may be used on accessory drive gearboxes or in air system control seals.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
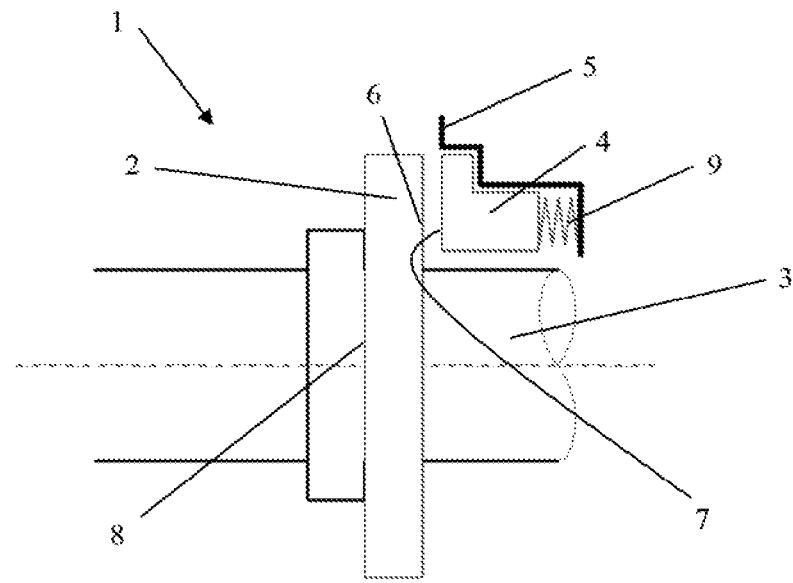
FIG. 1 shows a prior art air-riding seal system.
Figure 2:
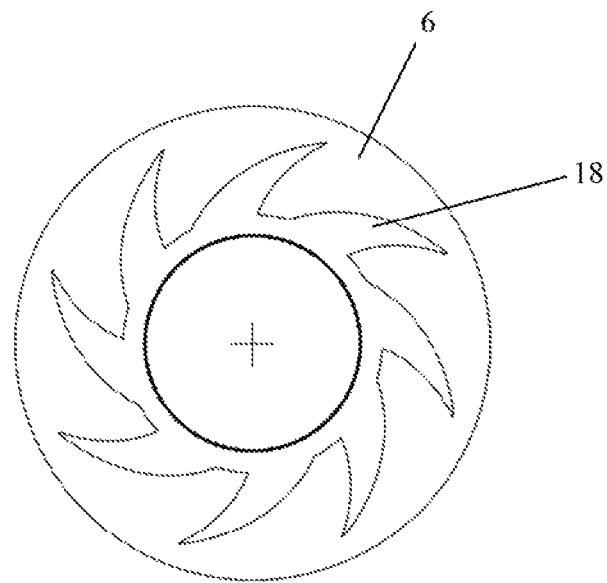
FIG. 2 shows the sealing face of a prior art sealing ring.
Figure 3:
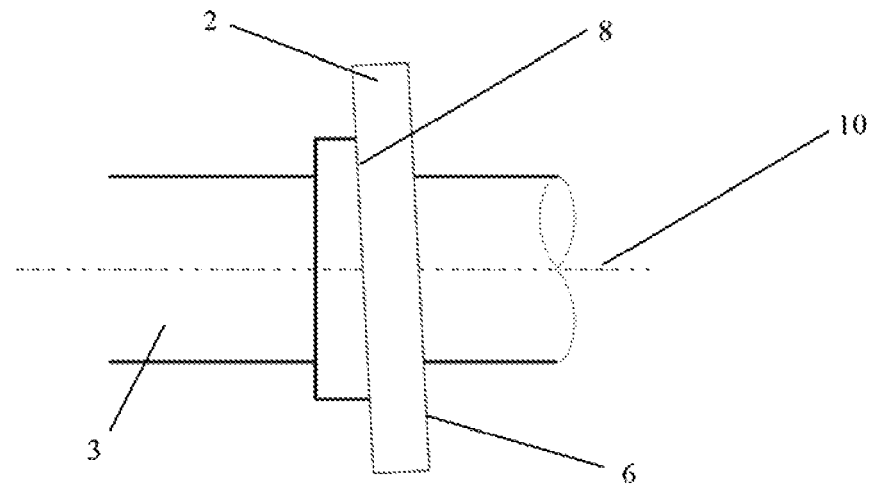
FIG. 3 shows a prior art seal assembly.

According to a first embodiment, the present invention provides a sealing element 2' having a radially inner mounting portion 11 mounted on a rotor 3, a radially outer sealing portion 12 having a sealing face 6' for facing a second sealing element (not shown) and a bridging portion 13 extending radially between the mounting portion 11 and sealing portion 12.

The mounting portion 11 is an annular portion comprising a central bore 14 for receiving the rotor 3. The rotor 3 comprises a stepped portion defining a rotor mounting surface 15. The mounting portion 11 of the sealing element 2' has a mounting surface which is affixed in abutment with the rotor mounting surface 15.

The sealing portion 12 is an annular portion.

The bridging portion 13 is an annular, radially-extending portion that allows axial displacement between the mounting portion 11 and sealing portion 12 and/or angular variation of the sealing face 6' relative to the mounting portion 11 by virtue of the fact that it is flexible/pliable and thus able to flex.

The mounting portion 11, bridging portion 13 and sealing portion 12 are all integrally formed of steel. The bridging portion 13 is thinner than the mounting and sealing portions 11, 12 i.e., it has a reduced axial dimension compared to the mounting and sealing portions 11, 12, This reduced thickness renders the bridging portion flexible/pliable.

The bridging portion 13 is axially recessed from the sealing face 6' of the sealing portion 12 and axially recessed from the mounting surface on the mounting portion 11. The bridging portion 13 extends between the axial centre of the mounting portion 11 and the axial centre of the sealing portion 12.

The bridging portion 13 meets the mounting portion 11 at a first shoulder portion comprising two concave surfaces 16, 16', on opposing axial sides of the sealing element 2'. The bridging portion 13 meets, the sealing portion 12 at a second shoulder portion comprising two, concave surfaces 17, 17', on opposing axial sides of the sealing element 2'.

Figure 5:
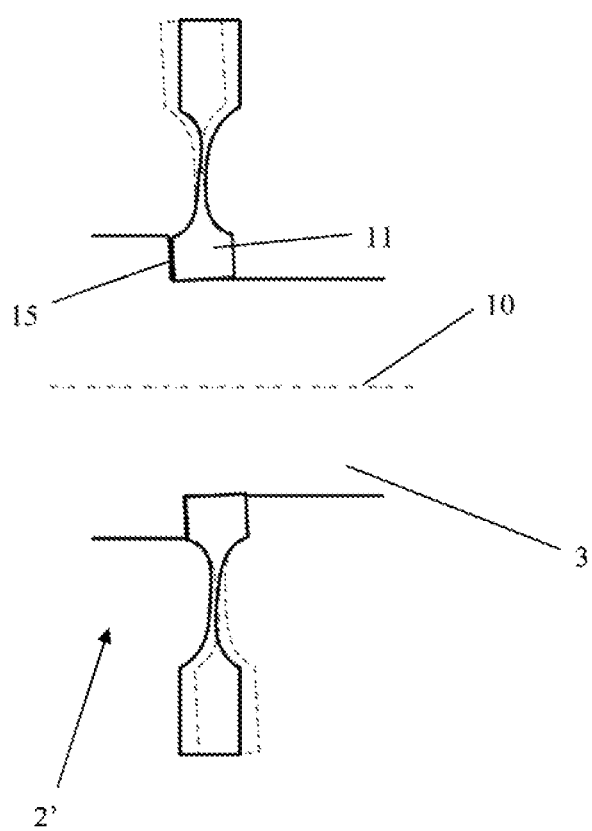
FIG. 5 shows the effect of various forces upon the first embodiment shown in FIG. 4.

It can be seen from FIG. 5 that the rotor mounting surface 15 is typically slightly deviated from perpendicular to the axis of rotation 10 of the rotor 3. This results in the radial extension of the sealing element 2' being angled away from perpendicular to the axis of rotation 10 as shown in dotted lines in FIG. 5 when the rotor and sealing element 2' are stationary.

Figure 4:
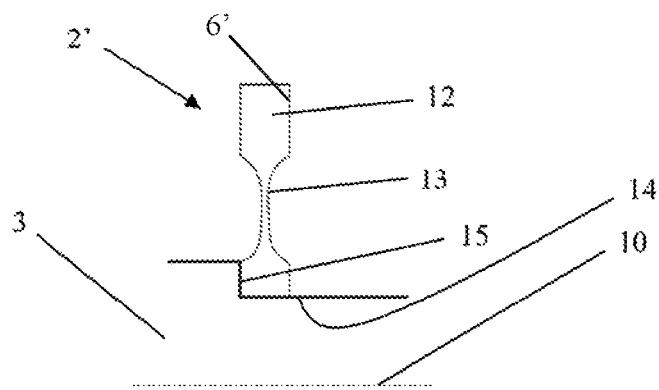
FIG. 4 shows a radial cross-section through a first embodiment of a assembly according to the present invention.
Figure 4:
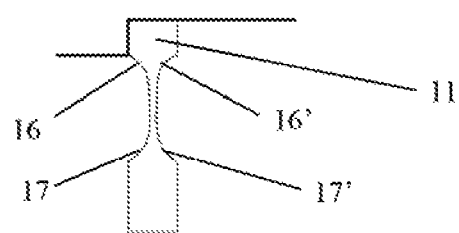

The sealing assembly of FIGS. 4 and 5 are incorporated into an air-riding seal arrangement similar to that shown in FIG. 1 with the sealing face 6' of the sealing portion 12 aligned with a second sealing element 4.

As the rotor 3 and sealing element 2' rotate, the resulting centrifugal forces will act more strongly on the radially outer sealing portion 12 than the radially inner mounting portion 11 creating a tensile force within the bridging section 13. This tensile force will contain a component that flexes the bridging portion 13 to adopt a more perpendicular orientation as shown in solid lines in FIG. 5. This flexing of the bridging portion 13 results in axial displacement between the mounting and sealing portions 11, 12 and angular variation of the sealing face 6' relative to the mounting portion such that the two portions are effectively decoupled. This means that transmittal of the swath movements arising from the non-perpendicular mounting of the mounting portion 11 on the rotor mounting surface 15 from the mounting portion to the sealing portion 12 are significantly reduced thus reducing awash movements at the air film interface between the sealing element 2' and the second sealing element 4. This increases reliability of the seal and reduces wear on the seal components.

As the sealing surface 6' of the sealing portion 12 rotates adjacent the second sealing element 4, lift forces generated by the air film between the sealing surface 6' and the second sealing element 4 are concentrated at the point(s) of closest proximity and these lift forces will exert a force at these points causing the bridging portion 13 to flex and the sealing portion 12 to move away from the second sealing element 4 thus reinforcing the axial displacement of the sealing portion to render the orientation of the sealing element 12 perpendicular to the axis of rotation 10 of the rotor 3.

Furthermore, any deformations in the rotor mounting face 15 (e.g. arising from circumferential weave) are isolated from the sealing portion 12 thus ensuring that the sealing efficiency is maximised.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An air-riding seal arrangement comprising:
    a sealing element having:
        a mounting portion configured to be mounted on a rotor, wherein the mounting portion is mounted directly on the rotor so as to directly contact a radially outward facing surface of the rotor;
        a sealing portion having a sealing face facing a second sealing element; and
        a bridging portion which is axially recessed from the sealing face of the sealing portion and extends radially between the mounting portion and the sealing portion, wherein the bridging portion allows axial displacement between the mounting portion and the sealing portion and/or angular variation of the sealing face relative to the mounting portion, and the bridging portion is recessed relative to the mounting portion such that the mounting portion extends further in the axial direction on both axial sides of the bridging portion;
    the rotor, wherein the sealing element is mounted on the rotor; and
    the second sealing element, wherein the second sealing element has a sealing surface facing the sealing element.

2. The air-riding seal arrangement according to claim 1, wherein the mounting portion is radially inwards from said sealing portion.

3. The air-riding seal arrangement according to claim 2, wherein the bridging portion is flexible/pliable to allow axial displacement between the mounting portion and the bridging portion and/or angular variation of the sealing face relative to the mounting portion.

4. The air-riding seal arrangement according to claim 3, wherein the bridging portion is an annular, radially-extending portion.

5. The air-riding seal arrangement according to claim 4, wherein the bridging portion is thinner than the mounting portion and/or the sealing portion.

6. The air-riding seal arrangement according to claim 1, wherein the mounting portion, the bridging portion and the sealing portion are integrally formed.

7. The air-riding seal arrangement according to claim 1, wherein the bridging portion is axially recessed from a mounting surface on the mounting portion, the mounting surface configured to be mounted against the rotor.

8. The air-riding seal arrangement according to claim 1, wherein the rotor comprises an annular flange or stepped portion having a rotor mounting surface and the mounting portion of the sealing element is affixed to the rotor mounting surface.

9. The air-riding seal arrangement according to claim 1, further comprising a static housing for supporting the second sealing element with an axial biasing element biasing the second sealing element towards the sealing element.

10. A gas turbine engine having the air-riding seal arrangement according to claim 1.

11. An air-riding seal arrangement comprising:
    a sealing element having:
        a mounting portion configured to be mounted on a rotor, wherein the mounting portion is mounted directly on the rotor so as to directly contact the rotor;
        a sealing portion having a sealing face facing a second sealing element; and
        a bridging portion which is axially recessed from the sealing face of the sealing portion and extends radially between the mounting portion and the sealing portion, wherein the bridging portion allows axial displacement between the mounting portion and the sealing portion and/or angular variation of the sealing face relative to the mounting portion;
    the rotor, wherein the sealing element is mounted on the rotor; and
    the second sealing element, wherein the second sealing element has a sealing surface facing the sealing element, and the bridging portion extends between an axial centre of the mounting portion and an axial centre of the sealing portion.

12. The air-riding seal arrangement according to claim 11, wherein the sealing element comprises a first shoulder portion between the mounting portion and the bridging portion, the first shoulder portion comprising at least one concave surface.

13. The air-riding seal arrangement according to claim 12, wherein the sealing element comprises a second shoulder portion between the sealing portion and the bridging portion, the second shoulder portion comprising at least one concave surface.

* * * * *